United States Patent
Brockhaus et al.

(10) Patent No.: US 10,706,137 B2
(45) Date of Patent: Jul. 7, 2020

(54) APPARATUS AND METHOD FOR USING A CUSTOMER DEVICE CERTIFICATE ON A DEVICE

(71) Applicant: Siemens Aktiengesellschaft, München (DE)

(72) Inventors: Hendrik Brockhaus, Unterbiberg (DE); Jens-Uwe Bußer, Neubiberg (DE)

(73) Assignee: Siemens Aktiengesellschaft, München (DE)

( * ) Notice: Subject to any disclaimer, the term of this patent is extended or adjusted under 35 U.S.C. 154(b) by 215 days.

(21) Appl. No.: 15/741,113

(22) PCT Filed: Jun. 27, 2016

(86) PCT No.: PCT/EP2016/064781
§ 371 (c)(1),
(2) Date: Jan. 5, 2018

(87) PCT Pub. No.: WO2017/021059
PCT Pub. Date: Feb. 9, 2017

(65) Prior Publication Data
US 2018/0211025 A1    Jul. 26, 2018

(30) Foreign Application Priority Data

Jul. 31, 2015   (DE) .................. 10 2015 214 696

(51) Int. Cl.
*G06F 21/33*   (2013.01)
*H04L 9/32*   (2006.01)
*H04L 29/06*   (2006.01)

(52) U.S. Cl.
CPC .............. *G06F 21/33* (2013.01); *H04L 9/321* (2013.01); *H04L 9/3247* (2013.01);
(Continued)

(58) Field of Classification Search
CPC ....... G06F 21/33; H04L 9/321; H04L 9/3247; H04L 9/3265; H04L 63/06; H04L 63/062; H04L 63/0823
See application file for complete search history.

(56) References Cited

U.S. PATENT DOCUMENTS 5,214,702 A    5/1993   Fischer
6,839,841 B1 *  1/2005   Medvinsky ............. G06F 21/33
                                            713/168
(Continued)

FOREIGN PATENT DOCUMENTS

DE    102013205051 A1    9/2014

OTHER PUBLICATIONS

Williams et al., Configuring enterprise public key infrastructures to permit integrated deployment of signature, encryption and access control systems, Oct. 2005, IEEE Military Communications Conference, vol. 4, pp. 2172-2175 (Year: 2005).*

(Continued)

*Primary Examiner* — Kenneth W Chang
(74) *Attorney, Agent, or Firm* — Schmeiser, Olsen & Watts LLP

(57) ABSTRACT

An apparatus for using a certificate on a device is proposed, including a processing unit for generating a certificate request and a transmitter-receiver unit for transmitting the generated certificate request to a first external computing unit, which is configured to generate a certificate for the device and to allow a second external computing unit to re-sign the certificate with an additional manufacturer's signature, and for receiving the re-signed certificate from the external computing unit. The processing unit is further configured to check the manufacturer's signature based on information stored in the device and to use the certificate
(Continued)

depending on a result of the check. Furthermore, a system and a corresponding method are proposed.

11 Claims, 4 Drawing Sheets

(52) U.S. Cl.
CPC ............ *H04L 9/3265* (2013.01); *H04L 63/06* (2013.01); *H04L 63/062* (2013.01); *H04L 63/0823* (2013.01); *G06F 2221/2115* (2013.01); *H04L 63/08* (2013.01)

(56) References Cited

U.S. PATENT DOCUMENTS

| | | |
|---|---|---|
| 8,850,208 B1 | 9/2014 | Parkinson |
| 2004/0148505 A1* | 7/2004 | Qiu .................... G06F 21/33 713/175 |
| 2005/0137898 A1* | 6/2005 | Wood .................. G06F 21/33 713/180 |
| 2005/0144437 A1* | 6/2005 | Ransom ................ G06F 1/28 713/151 |
| 2008/0184030 A1* | 7/2008 | Kelly .................. H04L 9/3268 713/156 |
| 2009/0083539 A1* | 3/2009 | Catherman ........... G06F 21/57 713/156 |
| 2010/0287231 A1 | 11/2010 | Hughes |
| 2012/0246470 A1 | 9/2012 | Haga |
| 2013/0129087 A1* | 5/2013 | Qi ...................... H04L 9/3263 380/44 |
| 2016/0057134 A1 | 2/2016 | Falk |

OTHER PUBLICATIONS

D. Cooper et al.: "Internet X.509 Public Key Infrastructure Certificate and Certificate Revocation List"; The Internet Engineering Task Force; pp. 54-71; XP055214380; Gefunden im Internet: URL:https://tools.ietf.org/pdf/rfc5280.pdf; 2008.

PCT International Search Report for PCT Application No. PCT/EP2016/064781 dated Sep. 29, 2016.

* cited by examiner

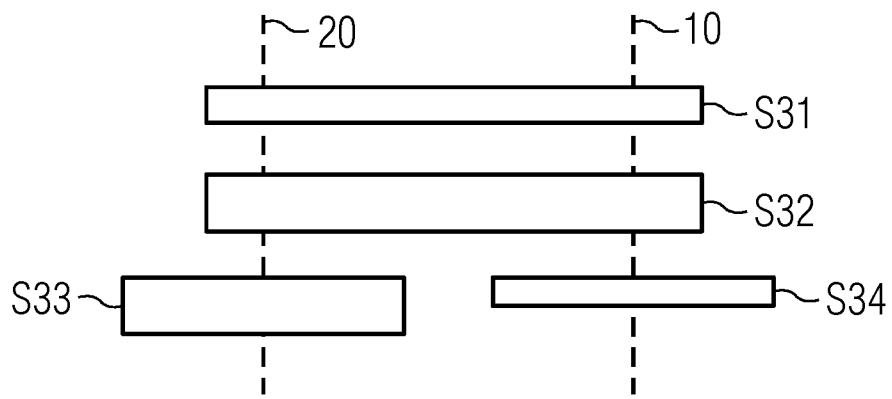
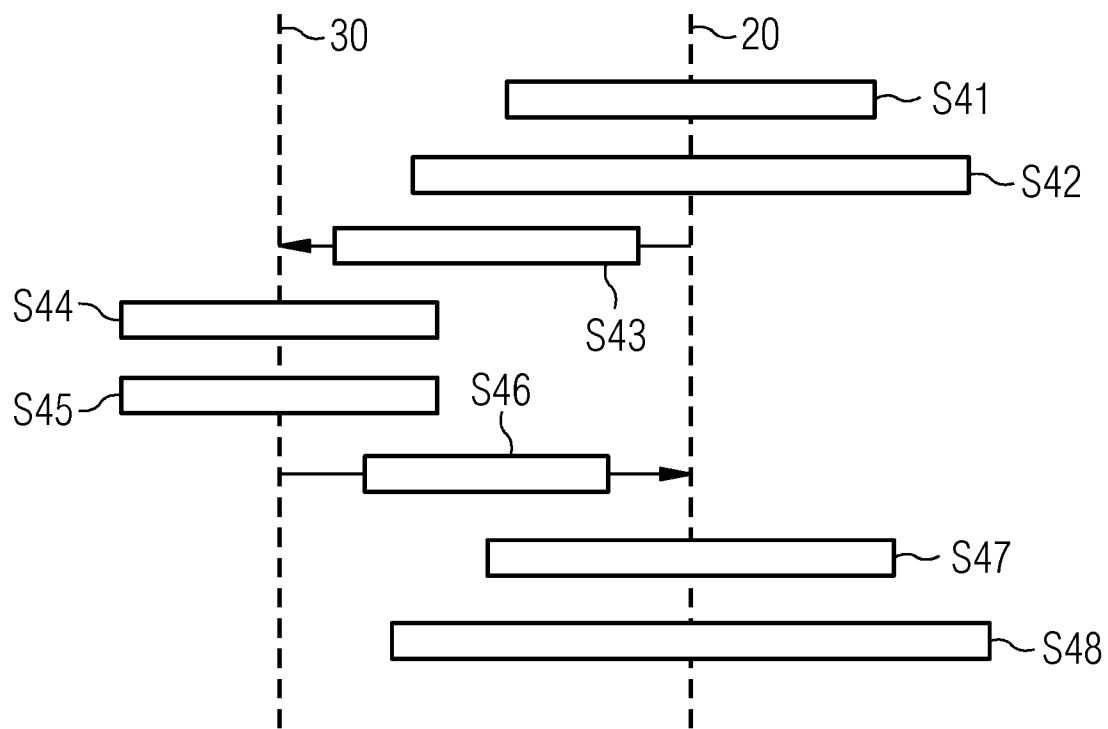

APPARATUS AND METHOD FOR USING A CUSTOMER DEVICE CERTIFICATE ON A DEVICE

CROSS-REFERENCE TO RELATED APPLICATIONS

This application claims priority to PCT Application No. PCT/EP2016/064781, having a filing date of Jun. 27, 2016, based off of German application No. DE 102015214696.0 having a filing date of Jul. 31, 2015, the entire contents of both of which are hereby incorporated by reference.

FIELD OF TECHNOLOGY

The present invention relates to an apparatus for using a customer device certificate on a device. Furthermore the present invention relates to a system with such an apparatus. Moreover the present invention relates to a method for using a customer device certificate on a device.

BACKGROUND

In many systems such as in network systems there may be a need for secure identification of devices. Such an identification may be effected by means of digital certificates. These may for example be type-specific certificates, where all devices of a particular type or series own the same certificate generated by the device manufacturer (and the same private key to it), which they can use to identify themselves as a device of this series.

Another possibility is to provide each device with an individual private key and its own digital certificate. This allows the device to be identified as a specific device with a unique serial number. Besides, an attacker who succeeds in gaining knowledge of the private key of a device can misuse only the certificate of this one device. This certificate can then be easily revoked. Other devices of the series are not affected either by the misuse or by the revocation of the certificate. Such device certificates, which are normally incorporated in the device as early as during production, may have a relatively long period of validity (equaling e.g. the service life of the device itself) and may be used as a trust anchor for rolling out (bootstrapping) further, mostly short-term certificates for everyday use.

Alternatively or additionally to such a manufacturer's device certificate the end user may also have an interest in incorporating in the device a permanent device certificate (customer's device certificate) from his own Certification Authority (CA), for example in order to securely store additional information therein and/or in order to have a trust anchor in the device which is independent of the manufacturer. Since it may be the case that the customer is not yet known at the time the device is being produced, and order and sale processes do not take place until production of the device has been completed and the device is waiting in the warehouse ready for delivery, the manufacturer may have to take suitable precautions as early as during manufacture in order to make it possible for his customer to incorporate a customer-specific device certificate. At the same time the manufacturer might like to have an overview of certificates incorporated in the device by the rightful owner of a device. In particular his customer-specific certificates may be incorporated, for example. Furthermore, on the part of the customer it may be desirable to have a self-incorporated certificate verified and/or protected by an external source.

Against this background it is a requirement of the present invention to allow secure customer device certificates to be used on devices.

SUMMARY

Accordingly, an apparatus for using a customer device certificate on a device is proposed. The apparatus comprises a processing unit for generating a certification request for a customer device certificate on the device and a transmitter-receiver unit for transmitting the generated certificate request to a first computing unit external to the apparatus, which is configured to generate a customer device certificate and to forward the generated customer device certificate to a second computing unit external to the apparatus, which is configured to re-sign the customer device certificate with a manufacturer's signature and to receive the re-signed customer device certificate. The processing unit is configured to check the manufacturer's signature based on information stored in the device and to use the customer device certificate depending on a result of the check.

The respective unit such as the processing unit or the transmitter-receiver unit may be implemented as hardware and/or as software. If implemented as hardware the respective unit may be configured as an apparatus or part of an apparatus, for example as a computer or as a microprocessor. If implemented as software the respective unit may be configured as a computer program product (non-transitory computer readable storage medium having instructions, which when executed by a processor, perform actions), as a function, as a routine, as part of a program code or as an executable object.

With the proposed apparatus it is possible to generate a customer- or device-specific certificate even after production, i.e. manufacture of a device. The manufacturer's control over certificates on devices may be maintained by the manufacturer via the second external computing unit, which re-signs the customer device certificate generated via the first computing unit by the customer. This offers a means of restricting to a certain extent the exchange of devices between different customers, because no customer can use customer device certificates for devices acquired by other customers. Furthermore this makes it possible to provide protection against attackers or against theft, since no new device certificate can be attached to the device without this being checked or allowed by the second external computing unit, which is to be assigned to the manufacturer.

Due to the proposed apparatus, bootstrapping of a customer device certificate is limited, so that the device only accepts customer device certificates which have been confirmed via a fixed entity, i.e. the second external computing unit, by the manufacturer. This confirmation is effected in the form of a signature by the manufacturer which accompanies the customer device certificate and which is checked by him, at least during loading or uploading onto the device. The apparatus may be a direct part of the device or may be implemented on the manufacturer's part as a registration authority and/or a certificate-generating authority. Only if the signature of the manufacturer or the external second computing unit is present and can be checked against a trust anchor of the manufacturer in the device can the customer device certificate generated by the first external computing unit be accepted and used.

The first and second external computing units may be implemented as a computer or a server arranged externally to the apparatus and the device. The communication between the apparatus and the first and/or second external computing unit may be effected over an (online) communication network or over other transmission paths such as email, data carriers etc.

According to one embodiment the device comprises a storage unit for storing a manufacturer's device certificate, wherein the processing unit is configured to generate the certification request for the customer device certificate using the manufacturer's device certificate.

With this arrangement the processing unit may use information contained in the manufacturer's device certificate in order to generate the certification request for the customer device certificate.

The manufacturer's device certificate may be stored in the storage unit as early as during manufacture of the device. Alternatively it may be received and stored afterwards, for example during a firmware update of the device.

According to a further embodiment the manufacturer's signature comprises the customer device certificate and other information.

This information may comprise, inter alia, the customer's security information which is to be passed to the device in a secure manner. This comprises, for example, the certificate of the first computing unit, trustworthy root certificates and certificates of planned communication partners of the device.

According to a further embodiment the processing unit is configured to check the manufacturer's signature based on a stored manufacturer's certificate (as a trust anchor).

The manufacturer's certificate may be used to check the signature of the manufacturer, i.e. of the second external computing unit, following receipt of the re-signed customer device certificate.

According to a further embodiment the transmitter-receiver unit is configured to receive data for the customer device certificate to be generated from the first external computing unit prior to generating the certificate request.

This data may be, for example, information on the algorithms and key lengths to be used and on the certificate extensions to be utilized and their values.

According to a further embodiment the data is signed with a signature of the first external processing unit and the processing unit is configured to check the signature of the first external computing unit.

In this way it can be ensured that the data for generating the customer device certificate originates from a trustworthy entity. Thus the danger of manipulation on the manufacturer's part or by an external computing unit can be reduced.

According to a further embodiment the processing unit is configured to check the signature of the first external computing unit based on information stored in the device.

For example, key pairs may be generated and distributed as early as during the manufacture of the device. Alternatively such key pairs can be generated after manufacture and stored in the apparatus.

According to a further embodiment the second external computing unit is configured to check the certificate generated by the first computing unit.

The second external computing unit on the manufacturer's side checks the certificate generated by the first computing unit on the customer's side, before confirming it by an additional signature. In this way it is ensured that only approved certificates can be installed on a device. In case this check is negative, an error message can be returned to the first external computing unit.

According to a further aspect a system is proposed, which comprises a second external computing unit for checking a certificate received by a first external computing unit and for signing the received certificate with a manufacturer's signature, and an above described apparatus for using a certificate on a device, wherein the transmitter-receiver unit of the apparatus is configured to transmit a certificate received by the first computing unit to the second external computing unit and to receive a re-signed certificate from the second external computing unit.

The embodiments and features described for the proposed apparatus apply analogously to the proposed system.

According to one embodiment the second external computing unit is configured to check a device signature of the received certificate.

In case the device signature cannot be verified, the received certificate may be discarded with an error message being sent to the apparatus. This is one way of ensuring that re-signing is only possible for particular certificates known to the second external computing unit.

According to a further embodiment the first external computing unit is configured to sign a public key of the device and to transmit the signed public key to the second external computing unit.

The second external computing unit can then check the signature of the customer device certificate from the first external computing unit, using a public key or a certificate of the first external computing unit.

According to a further aspect a method is proposed for using a customer device certificate on a device. The method comprises the following steps: generating a certificate request for a customer device certificate on the device, transmitting the generated certificate request to a first external computing unit which is configured to generate a customer device certificate and to forward the generated customer device certificate to a second external computing unit which re-signs the generated customer device certificate with a manufacturer's signature, receiving the manufacturer's signature based on information stored in the device, and using the customer device certificate depending on a result of the check.

The embodiments and features described for the proposed apparatus and the system apply analogously to the proposed method.

Furthermore, a computer program product is proposed which initiates the execution of the above explained method on a program-controlled unit.

A computer program product such as a computer programming means can for example be provided or supplied as a storage medium, e.g. a memory card, USB stick, CD-ROM, DVD or in the form of a downloadable file on a server in a network. This can, for example, be done in a wireless communication network by transmitting a respective file with the computer program product or the computer programming means.

Further possible combinations of the invention also encompass combinations of not explicitly mentioned features or embodiments described previously or hereunder regarding exemplary embodiments. The expert would add individual aspects to the respective basic form of the invention as improvements or amendments.

BRIEF DESCRIPTION

Further advantageous designs and aspects of the invention are the subject of the sub-claims and the exemplary embodiments of the invention described hereunder. The invention will now be described in detail by way of preferred embodiments with reference to the accompanying figures.

FIG. 3 shows a schematic flow diagram of a part of a method for using a customer device certificate during manufacture of the device;

FIG. 4 shows a schematic flow diagram of a further exemplary embodiment of a method for using a customer device certificate for a device;

DETAILED DESCRIPTION

Figure 1:
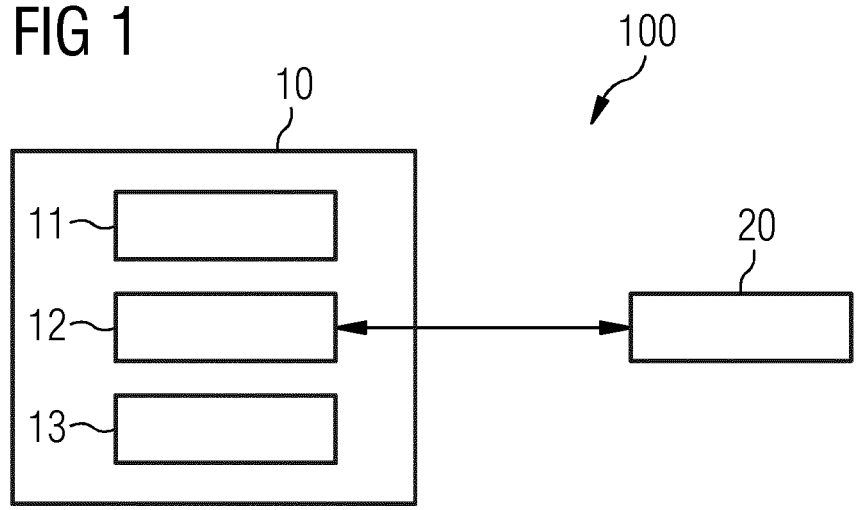
FIG. 1 shows a schematic block diagram of an exemplary embodiment of an apparatus for using a customer device certificate for a device.

Some of the embodiments will be described in detail, with reference to the following figures, wherein like designations denote like members, wherein:

FIG. 1 shows a system 100 with an apparatus 10 for using a customer device certificate in a device. The apparatus 10 comprises a processing unit 11, a transmitter-receiver unit 12 and a storage unit 13.

To begin with, the processing unit 11 generates a certificate request for a customer device certificate. The transmitter-receiver unit 11 transmits the generated certificate request to a first computing unit 30 external to the apparatus 10 (not shown in FIG. 1). The first external computing unit 30 is configured to generate a customer device certificate and to forward the generated customer device certificate to a second external computing unit 20 which re-signs the customer device certificate with a manufacturer's signature. The transmitter-receiver unit 12 then receives the re-signed customer device certificate.

The processing unit 11 checks the manufacturer's signature based on information stored in the storage unit 13. If the check produces a positive result the customer device certificate may be used. Otherwise the customer device certificate may be discarded or deleted.

Figure 2:
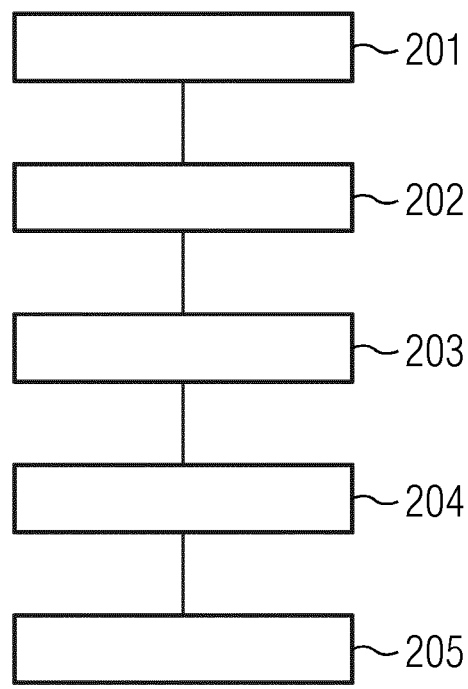
FIG. 2 shows a schematic flow diagram of an exemplary embodiment of a method for using a customer device certificate for a device.

FIG. 2 shows a method for using a customer device certificate in a device. The method comprises the steps 201 to 205.

In step 201 a certificate request is generated for a customer device certificate on the device.

In step 202 the generated certificate request is transmitted to a first external computing unit 30. This is configured to generate a customer device certificate and to forward the generated customer device certificate to a second external computing unit 20, which re-signs the generated customer device certificate with a manufacturer's signature.

In step 203 the re-signed customer device certificate is received.

In step 204 the manufacturer's signature is checked based on information stored in the device.

In step 205 the customer device certificate is used depending on a result of the check.

FIGS. 3 to 8 show various exemplary flow sequences for using a device. These can also be used in different combinations. In this context the terms CA (Certification Authority) of the customer and first external apparatus 30 are used synonymously. Furthermore the terms manufacturer, distribution computer, production computer and second external computing unit 20 are used synonymously.

FIG. 3 shows the flow sequence during the manufacture or production of a device 10.

In step S31 a manufacturer's device certificate is optionally generated by a manufacturer's certification authority 20 and incorporated in the device 10. This may for example be effected when loading the firmware.

In step S32 the key pairs and a request (certificate signing request, CSR) for applying for a customer device certificate are generated. In particular if the customer needs or requests a manufacturer-independent trust anchor in the device 10, the private key should be generated exclusively in the device 10 and never leave it. The public key is read out by the production computer 20 (imprinting station for manufacturer's device certificates, test computer for quality control, and others) during production. Alternatively the key pair may be generated in, for example, this production computer, and the private key is then transmitted into the device and subsequently deleted from outside.

In step S33 the public key is stored in the production computer 20 and in step S34 the private key is stored in the device 10. The public key is stored outside the device 10, for example in a database of the production computer 20 (or in SAP). The key pair, in particular the private key, is only stored in the device 10. Apart from the public key of the device 10, further information about the device (e.g. manufacturer, type, serial number) may be stored, which is to be incorporated in the customer device certificate possibly at a later time. This data may for example be stored in the form of a self-signed CSR or a container which is signed with the manufacturer's device certificate.

FIG. 4 shows the flow sequence following the sale of a device 10.

If the device 10 is sold to a customer, an entity at the manufacturer, in the following referred to as distribution computer 20, collects the public key of the device 10 from the database in step S41, adds, as required, further data to the public key and/or adapts existing data (e.g. subject name) and signs the same (S42). The distribution computer 20 may also perhaps generate a new modified CSR, but cannot sign it with the private key of the device 10, which is only stored in the device 10.

The distribution computer 20, in step S43, then transmits the public key of the device 10 including all additional data to the customer in order to apply for a customer device certificate for the device. The entity 30 of the customer which receives the data may for example be a registration authority (RA) in the customer's network, or a local registration authority (customer LRA) in the manufacturer's 20 network, which is made available to the manufacturer by the customer. The entity 30 represents the first external apparatus 30.

Transmission is preferably carried out via a secure connection (TLS, IPsec) and/or in a transport container or protocol, which is particularly protected, i.e. signed by the distribution computer 20 and/or the customer LRA.

The CA (or an upstream RA) of the customer checks the manufacturer's 20 signature in step S44 and, as required, adds further data and/or adapts existing data. Then the CA generates a customer device certificate for the device 10

(S45). Subsequently this customer device certificate is returned to the distribution computer 20 (S46).

This checks (S47) whether the customer device certificate was generated by a known and admissible CA 30 of the correct customer and whether the correct attributes are present: if not, it is discarded with an error message being sent to an administrator and/or customer RA/CA 30. Following a successful check the customer device certificate is provided by the distribution computer 20 with a further signature of its own and stored (S48).

Figure 5:
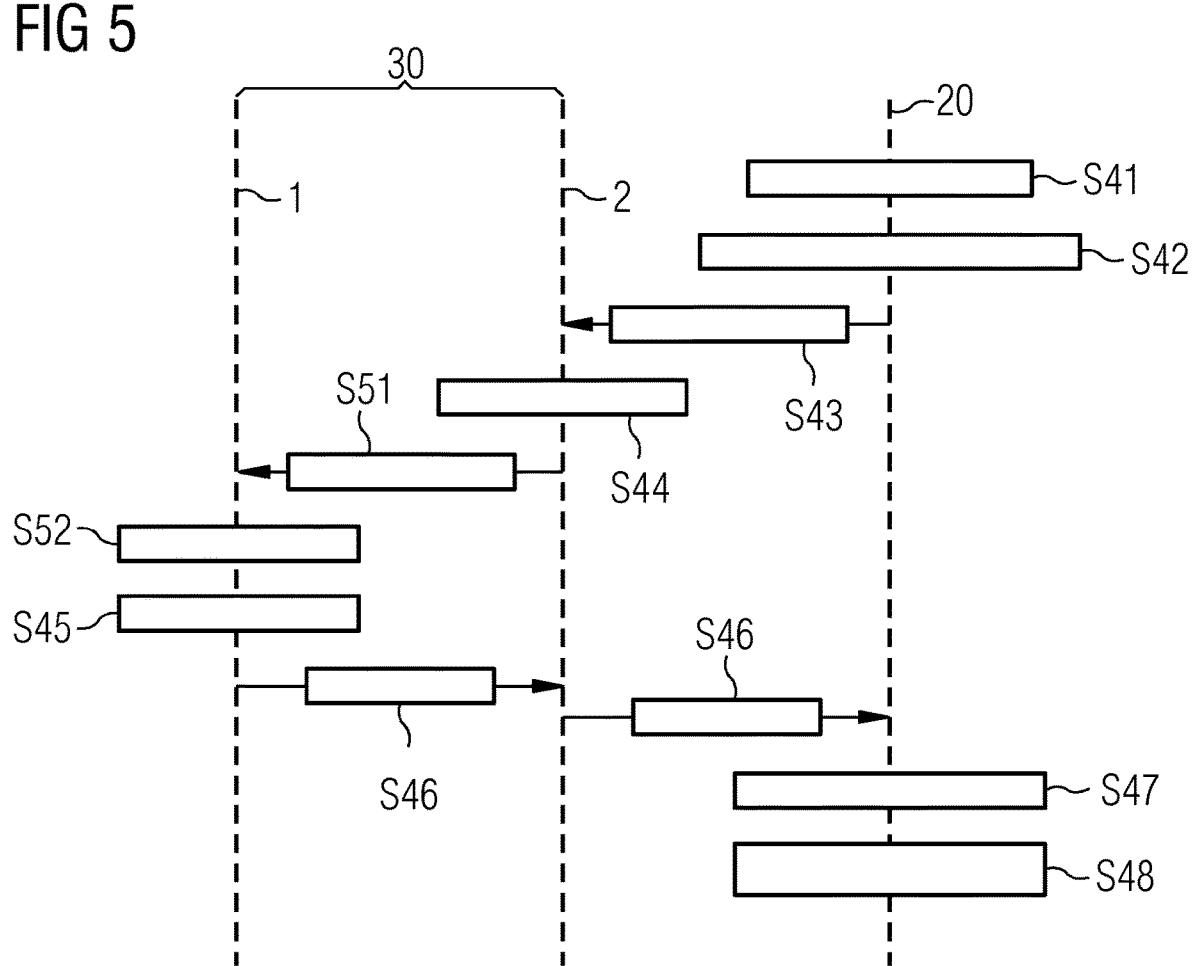
FIG. 5 shows a schematic flow diagram of a further exemplary embodiment of a method for using a customer device certificate for a device.

FIG. 5 shows an exemplary flow sequence during the sale, when the customer 30 provides a local registration authority (LRA) 2 to the manufacturer 20. In this case, in an additional step S51, a data record signed by the LRA 2, which is based on the data generated in step S42, is sent to the customer's registration authority (RA) 1, which in turn checks the LRA signature in step S52. The generated certificate would then be sent in step S46 to the distribution computer 20 via the LRA 2.

If the customer of the device 10 is already known during production, production computer and distribution computer may coincide. The customer device certificate can then, in principle, be loaded into the device 10 as early as during production (or in the manufacturer's warehouse).

Figure 6:
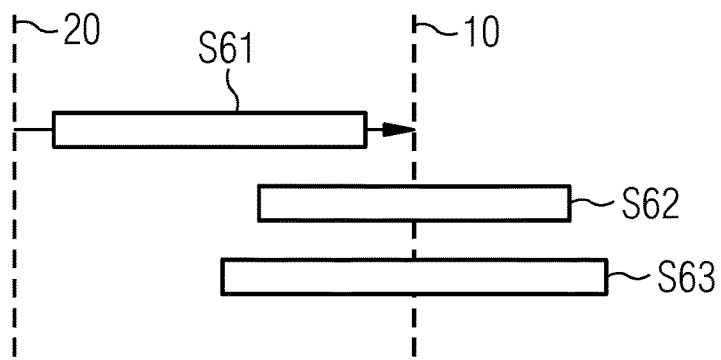
FIG. 6 shows a schematic flow diagram of a part of the method for using a customer device certificate when accepting a customer device certificate in the device.

If the device 10 is installed in the field or in a test plant, the customer device certificate is incorporated into the device 10 (unless already previously loaded), as shown in FIG. 6. This may, for example, be effected upon the device's 10 initiative as per automatic download from a server in the network, or by a technician loading it via a maintenance or administration interface. The device 10 checks whether the customer device certificate received in step S61 has a manufacturer's 20 confirmation (signature) (step S62). If yes, it is accepted.

Figure 7:
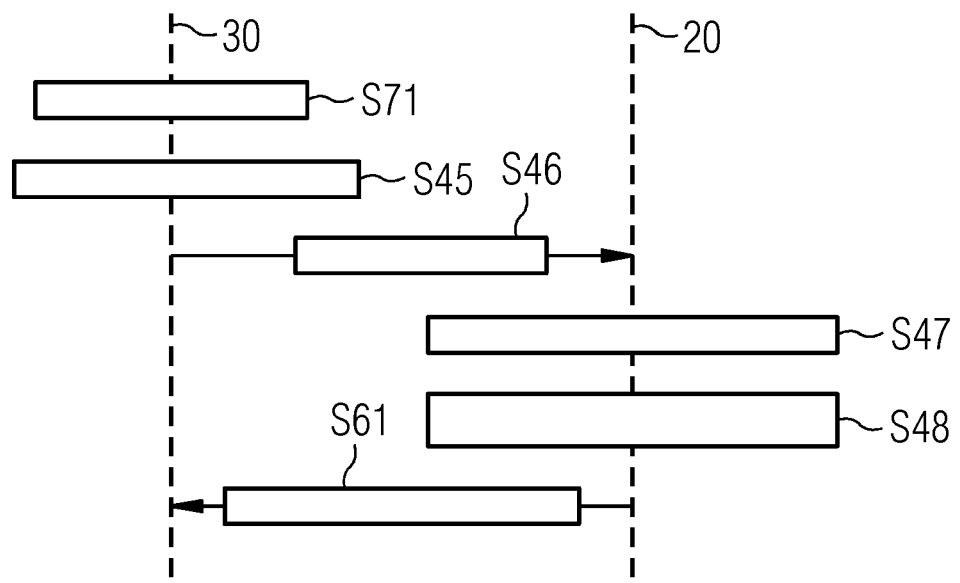
FIG. 7 shows a schematic flow diagram of a further exemplary embodiment of a method for using a customer device certificate for a device.

In an alternative embodiment the key pair can be generated directly by the customer, as shown in FIG. 7. For the customer this has the advantage that he is completely independent of the manufacturer 20. The customer can himself ensure the quality of the generated keys, and the manufacturer 20 does not acquire knowledge of the private key. To this end the CA 30 generates the key pair and certificate for each device (S71). The certificate is then sent to the manufacturer (S46), who checks it (S47), re-signs it as required (S48) and returns it to the customer (S61).

Figure 8:
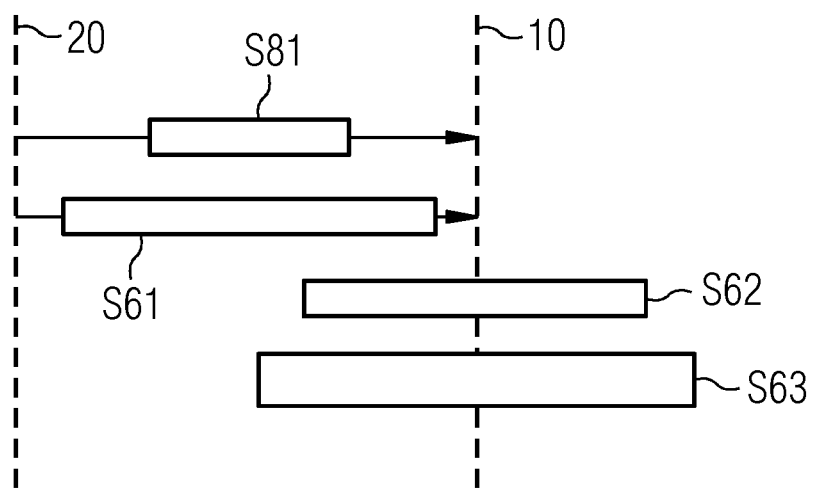
FIG. 8 shows a schematic flow diagram of a part of the method for using a customer device certificate when accepting a customer device certificate in the device.

During loading into the device 10 care should be taken that in addition to the customer device certificate the associated private key is also loaded in a secure manner. This is shown in FIG. 8, step S81.

Although the present invention has been described by way of exemplary embodiments, it can be modified in many ways.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. An apparatus for using a customer device certificate on a device, comprising:
a storage unit for storing a manufacturer's device certificate;
a processing unit for generating a certificate request for the customer device certificate on the device, wherein the processing unit is configured to generate the certificate request for the customer device certificate using the manufacturer's device certificate; and
a transmitter-receiver unit for transmitting the certificate request to a first computing unit external to the apparatus, the first computing unit being configured to generate the customer device certificate and to forward the generated customer device certificate to a second computing unit external to the apparatus, the second computing unit being configured to re-sign the generated customer device certificate with a manufacturer's signature, and for receiving the re-signed certificate;
wherein the processing unit is configured to check the manufacturer's signature based on information stored in the device and to use the re-signed customer device certificate depending on a result of the check;
wherein the manufacturer's signature comprises the customer device certificate and further information.

2. The apparatus as claimed in claim 1, wherein the processing unit is configured to check the manufacturer's signature based on the stored manufacturer's certificate.

3. The apparatus as claimed in claim 1, wherein the transmitter-receiver unit is configured to receive data for the customer device certificate to be generated from the first external computing unit prior to generating the certificate request.

4. The apparatus as claimed in claim 3, wherein the data is signed with a signature of the first computing unit and in that the processing unit is configured to check the signature of the first external computing unit.

5. The apparatus as claimed in claim 4, wherein the processing unit is configured to check the signature of the first external computing unit (30) based on information stored in the device.

6. The apparatus as claimed in claim 1, wherein the second external computing unit is configured to check the customer device certificate generated by the first external computing unit.

7. A system comprising:
a second external computing unit for checking a customer device certificate received from the first external computing unit and signing the received customer device certificate with a manufacturer's signature, and an apparatus for using a customer device certificate on a device as claimed in claim 1, wherein the transmitter-receiver unit of the apparatus is configured to receive a customer device certificate generated by the first external computing unit and a customer device certificate re-signed by the second external computing unit from the second external computing unit.

8. The system as claimed in claim 7, wherein the second external computing unit is configured to check a manufacturer's signature of the received customer device certificate.

9. The system as claimed in claim 7, wherein the first external computing unit is configured to sign a public key of the device and to transmit the signed public key to the apparatus.

10. A method for using a customer device certificate on a device, involving:
generating a certificate request for a customer device certificate on the device, wherein the certificate request for the customer device certificate is generated using a manufacturer's device certificate stored on the device;
transmitting the generated certificate request to a first external computing unit which is configured to generate a customer device certificate and to forward the generated customer device certificate to a second external computing unit, which re-signs the generated customer device certificate with a manufacturer's signature;

receiving the re-signed customer device certificate;

checking the manufacturer's signature based on information stored in the device; and using the customer device certificate depending on a result of the check;

wherein the manufacturer's signature comprises the customer device certificate and further information.

11. A computer program product comprising a computer readable hardware storage device having computer readable program code stored therein, said program code executable by a processor of a computer system to implement a method comprising:

generating a certificate request for a customer device certificate on the device, wherein the certificate request for the customer device certificate is generated using a manufacturer's device certificate stored on the device;

transmitting the generated certificate request to a first external computing unit which is configured to generate a customer device certificate and to forward the generated customer device certificate to a second external computing unit, which re-signs the generated customer device certificate with a manufacturer's signature;

receiving the re-signed customer device certificate;

checking the manufacturer's signature based on information stored in the device; and using the customer device certificate depending on a result of the check;

wherein the manufacturer's signature comprises the customer device certificate and further information.

* * * * *